United States Patent
Jung (10) Patent No.: US 10,293,849 B2
(45) Date of Patent: May 21, 2019

(54) CONTROL APPARATUS AND METHOD OF MOTOR DRIVEN POWER STEERING SYSTEM

(71) Applicants: Hyundai Motor Company, Seoul (KR); Kia Motors Corporation, Seoul (KR)

(72) Inventor: Jang Hyun Jung, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 144 days.

(21) Appl. No.: 15/366,977

(22) Filed: Dec. 1, 2016

(65) Prior Publication Data

US 2018/0050723 A1 Feb. 22, 2018

(30) Foreign Application Priority Data

Aug. 17, 2016 (KR) .................. 10-2016-0103995

(51) Int. Cl.
*B62D 5/04* (2006.01)

(52) U.S. Cl.
CPC ......... *B62D 5/0463* (2013.01); *B62D 5/0466* (2013.01)

(58) Field of Classification Search
CPC ................... B62D 5/0463; B62D 5/0466
See application file for complete search history.

(56) References Cited

FOREIGN PATENT DOCUMENTS

| JP | 2009-166832 A | 7/2009 |
| JP | 2015-189415 A | 11/2015 |

OTHER PUBLICATIONS

Machine Translation of JP 2015-187415 (Year: 2015).*

* cited by examiner

*Primary Examiner* — Alan D Hutchinson
(74) *Attorney, Agent, or Firm* — Morgan, Lewis & Bockius LLP (57) ABSTRACT

A control apparatus and a method of a motor driven power steering (MDPS) system are provided. The control apparatus includes: a predetermined MDPS logic device configured to determine and output a motor control value using driver steering input information and vehicle state information; a state determination device configured to determine whether a steering wheel is in a steering state or a restoration state based on the driver steering input information, and output steering wheel state information; a compensation logic device configured to determine an elasticity compensation value depending on the driver steering input information and the vehicle state information, and determine and output a target control value based on the motor control value, the elasticity compensation value and the steering wheel state information; and a motor control logic device configured to control a steering motor to generate an auxiliary steering torque depending on the target control value.

10 Claims, 8 Drawing Sheets

CONTROL APPARATUS AND METHOD OF MOTOR DRIVEN POWER STEERING SYSTEM

CROSS-REFERENCE TO RELATED APPLICATION

The present application claims priority to Korean Patent Application No. 10-2016-0103995 filed on Aug. 17, 2016, the entire contents of which is incorporated herein for all purposes by this reference.

BACKGROUND OF THE INVENTION

Field of the Invention

The present invention relates to a motor driven power steering system. More particularly, it relates to a control apparatus and a method of a motor driven power steering system which can enhance a steering sensation of a driver not only in a steering section in which the driver rotates a steering wheel from an on-center position to the left or the right so as to steer the vehicle, but also in a restoration section in which the rotated steering wheel rotates and returns to the on-center position.

Description of Related art

Generally, examples of a power assistance steering system for reducing steering force of a driver when steering a vehicle include a Hydraulic Power Steering (HPS) system which uses hydraulic pressure formed by a hydraulic pump to assist with the steering force of the driver, and a Motor Driven Power Steering System (MDPS) which uses output torque of an electric motor to assist with the steering force of the driver, and so forth.

In the MDPS system, the output of the electric motor for steering assistance in performing a steering assistance function depending on a steering wheel manipulation of the driver can be controlled depending on driving conditions of the vehicle. Therefore, the MDPS system provides further enhanced steering performance and steering sensation compared to those of the HPS system.

Given this, recently produced vehicles are widely provided with MDPS systems which can change and control assistance steering force generated by the output of the motor depending on driving conditions.

Such an MDPS system includes sensors such as a steering angle sensor which detects a steering angle (a column input angle) varying depending on steering wheel manipulation of a driver, a torque sensor which detects steering torque (steering wheel torque, column torque) inputted through the steering wheel, a vehicle speed sensor which detects the speed of the vehicle, a wheel speed sensor, an engine rpm sensor, a yaw rate sensor, etc., a controller (an MDPS ECU), and a steering motor (an MDPS motor).

In the above-mentioned configuration, the controller receives and obtains, to control the operation and output of the steering motor, driver steering input information such as a steering angle, a steering angular speed, steering torque, etc. and vehicle state information such as a vehicle speed, a wheel speed, an engine RPM, a yaw rate, etc.

The steering angle refers to the position of the steering wheel. The steering angular speed may be an angular speed which is obtained through a separate sensor or from a differentiated signal of a steering angle signal. The steering torque is torque which is applied from the driver to the steering wheel, in other words, is a driver input torque.

The controller controls the driving force of the steering motor depending on the vehicle speed to generate controlled assistance torque (hereinafter, referred to as 'auxiliary steering torque'). In this regard, under conditions of a low vehicle speed, the motor output for steering assistance is increased to enable the driver to manipulate the steering wheel with comparatively small force. Under conditions of a high vehicle speed, the motor output is reduced to make the driver manipulate the steering wheel with comparatively large force so that the driving stability of the vehicle can be secured.

When the vehicle moves at a high speed, if the steering wheel is excessively light, a dangerous situation may be caused despite the fact that the driver manipulates the steering wheel with small force. Thus, the driving stability is reduced. Given this, steering assistance characteristics are changed depending on the vehicle speed, wherein when the vehicle moves at a high speed, auxiliary steering torque is applied such that the force required to control the steering wheel is increased, whereby the stability in controlling the steering wheel can be enhanced.

Typically, the output of the steering motor for assisting with the steering force of the driver is generated while the controller controls motor current (assist control current) to be applied to the steering motor.

In this regard, the controller is configured to determine, as it is tuned, current corresponding to an output value determined based on information basically collected from the vehicle, that is, driver steering input information and vehicle state information, and applies the determined current to the steering motor. Thereby, the steering motor is operated to generate auxiliary steering torque that is force for assisting with the steering force of the driver.

In the steering system, elements for transmitting the driver steering force to be applied through the steering wheel and the assistance steering force generated by the motor depending on the driver steering wheel, include a steering column which is installed under the steering wheel, a gear box which converts the rotating force transmitted from the steering column into linear force, and a universal joint which transmits the rotating force from the steering column to the gear box.

The gear box includes a pinion gear which receives the rotating force from the universal joint, and a rack bar on which a rack engaging with the pinion gear is provided. When the pinion gear rotates, the rack bar is linearly moved by the rack to the left or the right.

In this regard, force generated by the left or right linear movement of the rack bar is transmitted to tires through a tie rod and a ball joint, thus changing the direction of the tires.

As described above, in the MDPS system, a motor control value is determined using information collected from the vehicle, and the operation of the motor is controlled using the motor control value, whereby steering assistance is embodied.

In this regard, the auxiliary steering torque outputted from the motor in the MDPS system influences a steering sensation that the driver feels when manipulating the steering wheel.

Figure 1:
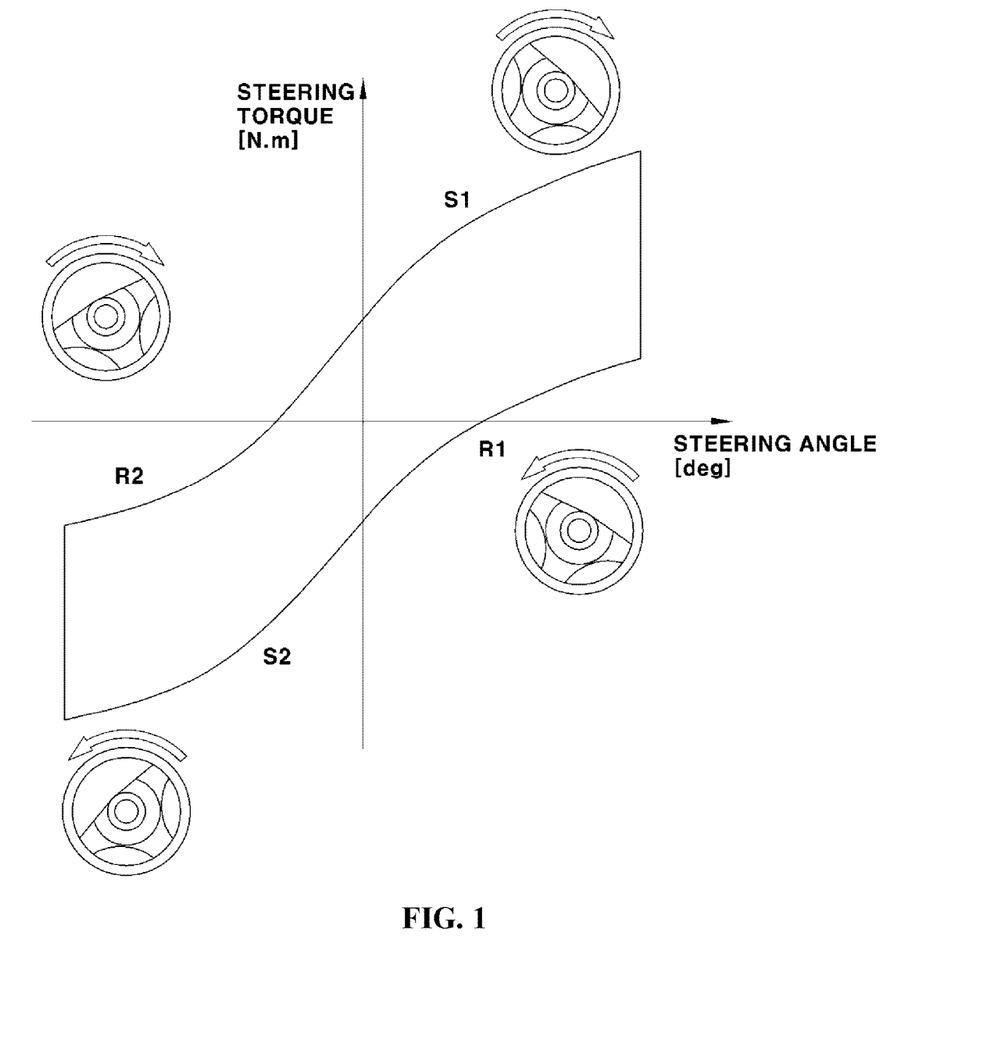
FIG. 1 is a view illustrating a hysteresis loop showing a steering torque that is detected by a driver depending on a steering angle in an MDPS system.

FIG. 1 illustrates a hysteresis loop showing steering torque that the driver feels depending on the steering angle under certain vehicle speed conditions in the MDPS system. The horizontal axis refers to the steering angle indicating the position of the steering wheel. The vertical axis refers to the steering torque applied to the steering wheel.

Here, a (+) region of the steering angle may refer to a position of the steering wheel that is rotated to the right based on an on-center position (0°), and a (−) region of the steering angle may refer to a position of the steering wheel that is rotated to the left based on the on-center position.

In addition, (+) or (−) of the steering torque indicate the direction in which the driver applies steering torque to the steering wheel. As the steering angle of the steering wheel rotated to the right is increased, the steering torque in the (+) direction is gradually increased and then smoothly varied (refer to section S1).

As the steering angle of the steering wheel rotated to the left is increased, the steering torque in the (−) direction is gradually increased and then smoothly varied (in the graph, the absolute value of the torque is increased) (refer to section S2).

Of course, the fact that the steering torque applied from the driver to the steering wheel is increased means that, reversely, the auxiliary steering torque generated by the motor is reduced. The fact that the steering torque is reduced means that the auxiliary steering torque is increased.

In FIG. 1, 'S1' or 'S2' refers to a steering section in which the driver rotates the steering wheel from the on-center position in any one direction, and 'R1' or 'R2' refers to a restoration section in which the steering wheel that has been rotated by the manipulation of the driver is rotated to return to the on-center position.

In the typical MDPS system, to enhance the steering sensation that the driver feels, an additional process of compensating a motor control value determined based on sensor detection values or the like is performed. The operation of the motor is controlled to generate an auxiliary steering torque with a compensated control value as a target value.

In this regard, the motor control value may be the auxiliary steering torque that is obtained based on the sensor detection values or the like in a basic MDPS logic. In this case, after compensation torque is determined from information collected from the vehicle, the auxiliary steering torque obtained in the basic MDPS logic is compensated for using the compensation torque. The operation of the motor is controlled with the compensated torque as the target control value.

Here, the current of the motor is controlled such that the compensated target control value is outputted. The operation of the motor that outputs the auxiliary steering torque is controlled by applying the motor current corresponding to the compensated target control value to the motor.

Alternatively, the motor control value may be the motor current (assist control current) that is obtained based on the sensor detection values or the like in the basic MDPS logic. In this case, a current compensation rate is determined from information collected from the vehicle, and the motor current obtained in the basic MDPS logic is compensated for at the current compensation rate. Thereafter, the operation of the motor is controlled by applying the motor current thereto.

However, in the conventional MDPS system, in compensating for the motor control value to output the auxiliary steering torque, a method of compensating for the motor control value is not divided according to the distinction of the steering section and the restoration section.

That is, only a method of enhancing the steering sensation that the driver feels mainly for the steering section has been known, and a technology for separately controlling compensation operations for the steering section and the restoration section is not present.

Therefore, there is a problem in that although the driver can feel satisfactory steering sensation in the steering section, the steering sensation in the restoration section is unsatisfactory.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing control apparatus and method of a motor-driven power steering system which can enhance a steering sensation of a driver not only in a steering section in which the driver rotates a steering wheel from an on-center position to the left or the right so as to steer the vehicle, but also in a restoration section in which the rotated steering wheel rotates and returns to the on-center position.

Various aspects of the present invention are directed to providing a control apparatus of a motor driven power steering (MDPS) system, including: a basic MDPS logic device configured to determine and output a motor control value for steering assistance using driver steering input information and vehicle state information that are collected from a vehicle; a state determination device configured to determine whether a steering wheel is currently in a steering state or a restoration state based on the driver steering input information, and output steering wheel state information; a compensation logic device configured to determine an elasticity compensation value depending on the driver steering input information and the vehicle state information from stored setting information, and determine and output a target control value based on the motor control value, the elasticity compensation value and the steering wheel state information; and a motor control logic device configured to control operation of a steering motor to generate an auxiliary steering torque depending on the target control value outputted from the compensation logic device.

Various aspects of the present invention are directed to providing a control method of a motor driven power steering system, including: determining a motor control value for steering assistance using driver steering input information and vehicle state information that are collected from a vehicle; determining whether a steering wheel is currently in a steering state or a restoration state based on the driver steering input information; determining an elasticity compensation value depending on the driver steering input information and the vehicle state information from stored setting information; determining a target control value based on the motor control value, the elasticity compensation value and the determined steering wheel state information; and controlling operation of a steering motor to generate an auxiliary steering torque depending on the target control value.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g.

fuels derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Further, in the following detailed description, names of constituents, which are in the same relationship, are divided into "the first", "the second", etc., but the present invention is not necessarily limited to the order in the following description.

In the specification, when an element is referred to as "comprising" or "including" a component, it does not preclude another component but may further include other components unless the context clearly indicates otherwise.

Various embodiments of the present invention relates to control apparatus and method of a motor driven power steering system (hereinafter, referred to as an 'MDPS') and is for providing control apparatus and method which can enhance a steering sensation, which is felt by a driver, in both a steering section and a restoration section of a steering wheel.

In an exemplary embodiment of the present invention, when the state of the steering wheel is sectioned into steering sections S1 and S2 and restoration sections R1 and R2, they can be expressed as shown in the hysteresis loop of FIG. 1. A section in which the steering wheel is rotated to the right or the left based on an on-center position can be defined as a steering section.

Furthermore, a section in which after the steering wheel has been rotated to the right or the left, the steering wheel is rotated to return while the steering torque has a torque value with hysteresis compared to that of the steering section, can be defined as a restoration section.

Therefore, S1 and S2 of FIG. 1 indicate steering sections, and R1 and R2 indicate restoration sections.

The steering torque in the hysteresis loop of FIG. 1 refers to a toque (inputted by the driver through the steering wheel) which is applied when the driver rotates the steering wheel. In the MDPS system, such a steering torque is detected by a torque sensor. The steering torque detected by the torque sensor is used as a control variable for controlling the operation of a motor.

The steering torque influences the steering sensation that is felt by the driver when he/she rotates the steering wheel.

Furthermore, in the MDPS system, a motor control value is determined using information collected from the vehicle through sensors or the like, and the operation of the motor is configured to be controlled using the motor control value, wherein steering assistance is embodied.

For example, a controller is configured to determine an auxiliary steering torque (or motor current), which is a motor control value depending on operation of the steering wheel by the driver, using driver steering input information including a steering angle and a steering torque which is detected by the sensors, and vehicle state information including a vehicle speed.

Furthermore, the controller controls, using the determined motor control value, motor current to be applied to the motor such that torque for the driver-steering assistance, that is, target auxiliary steering torque, is outputted from the real motor.

In the MDPS system, because the auxiliary steering torque outputted from the motor is torque functioning as steering assistance force, this also influences the steering sensation which is felt by the driver when he/she operates the steering wheel.

The steering angle refers to a position of the steering wheel. In FIG. 1, a (+) region of the steering angle may refer to a position of the steering wheel that is rotated to the right based on the on-center position (0°), and a (−) region of the steering angle may refer to a position of the steering wheel that is rotated to the left based on the on-center position.

In addition, (+) or (−) of the steering torque indicate the direction in which the driver applies steering torque to the steering wheel. In the steering section S1, as the steering angle of the steering wheel rotated to the right is increased, the steering torque in the (+) direction is gradually increased and then smoothly varied.

In the steering section S2, as the steering angle of the steering wheel rotated to the left is increased, the steering torque in the (−) direction is gradually increased and then smoothly varied (in the graph, the absolute value of the torque is increased).

Of course, the fact that the steering torque applied from the driver to the steering wheel is increased means that, reversely, the auxiliary steering torque generated by the motor is reduced. The fact that the steering torque is reduced means that the auxiliary steering torque is increased. Given this, in setting information for controlling the MDPS system, the auxiliary steering torque is set such that the steering torque for the steering angle is represented as shown in the hysteresis loop of FIG. 1.

When the MDPS system is configured to be controlled, elasticity compensation control may be performed so that while operating the steering wheel, the driver can sense tension from the steering wheel as when the steering wheel is pulled by an elastic member including a spring.

Figure 2:
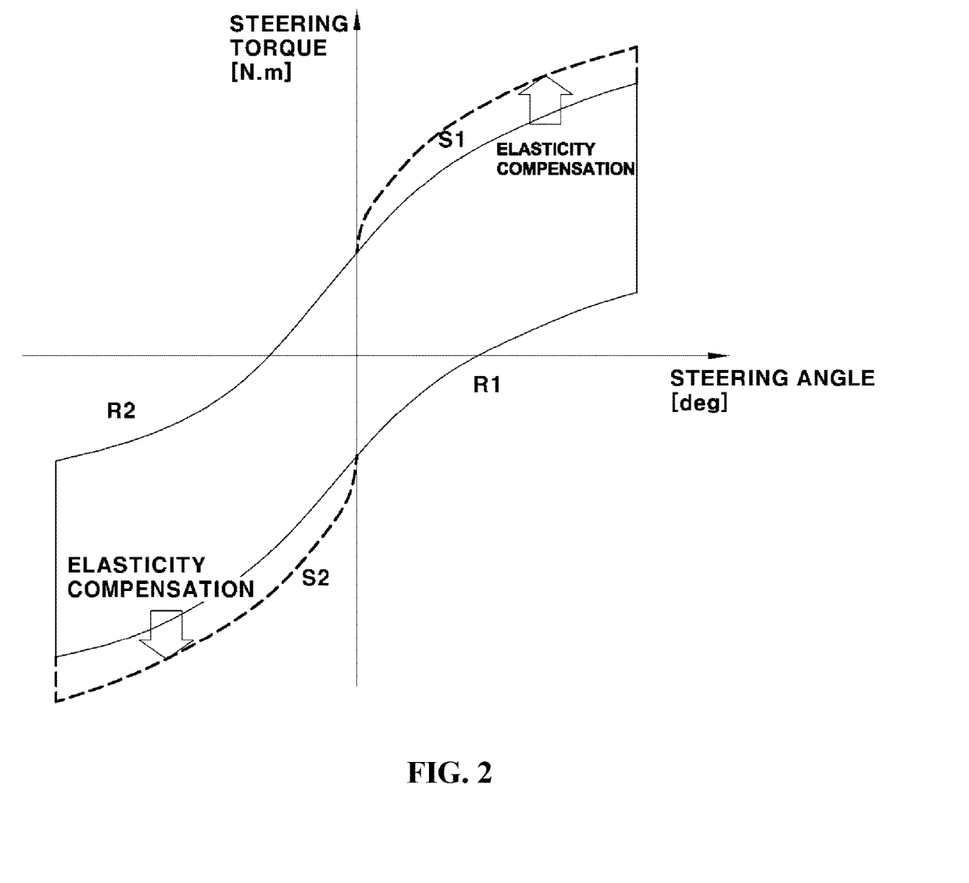
FIG. 2 is a view for describing elasticity compensation according to an exemplary embodiment of the present invention.

FIG. 2 is a view for describing the elasticity compensation according to an exemplary embodiment of the present invention.

The elasticity compensation control is for enhancing the steering sensation by making the driver be configured to sense elastic tension from the steering wheel when he/she operates the steering wheel. To enhance the elasticity, there is the need for the steering wheel to be set such that, when the driver rotates the steering wheel to the right or the left by an arbitrary steering angle based on the on-center position (0°), as the steering angle is increased, the steering torque that is applied and sensed by the driver is increased.

First, the configuration of the control apparatus for performing the elasticity compensation control will be described.

Figure 3:
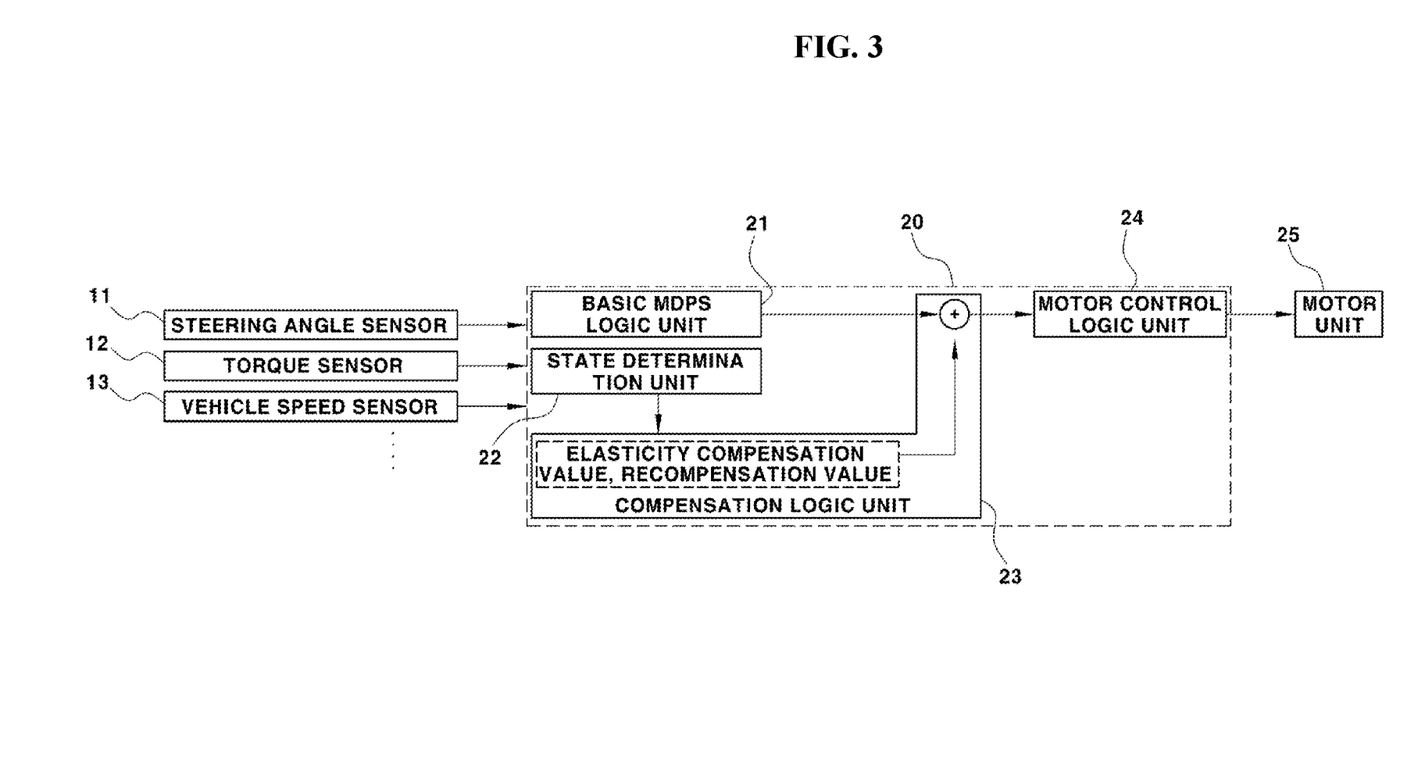
FIG. 3 is a block diagram illustrating the configuration of a control apparatus according to an exemplary embodiment of the present invention.

FIG. 3 is a block diagram illustrating the configuration of the control apparatus according to an exemplary embodiment of the present invention. The control apparatus according to an exemplary embodiment of the present invention is included in a controller 20 and, as shown in the drawing, includes: a basic MDPS logic device 21 which is configured to determine a motor control value for steering assistance, using the driver steering input information including the steering angle and the steering torque and the vehicle state information including the vehicle speed that are obtained through sensors 11, 12 and 13, and outputs the determined motor control value; a state determination device 22 which is configured to determine, based on the driver steering input information, whether the steering wheel is currently in a steering state (corresponding to the steering section) or a restoration state (corresponding to the restoration section) and outputs steering wheel state information; a compensation logic device 23 which is configured to determine, using the stored setting information, an elasticity compensation value depending on the driver steering input information and the vehicle state information, and is configured to determine and outputs a target control value based on the motor control value, the elasticity compensation value and the steering wheel state information; and a motor control logic device 24 which controls the operation of a steering motor depending on the target control value outputted from the compensation logic device 23.

In FIG. 3, the motor unit 25 may include the steering motor (MDPS motor) and an inverter for driving the steering motor. The inverter operates according to a control signal (e.g., a PWM signal) outputted from the motor control logic device 24 and drives the steering motor.

The motor control value may be auxiliary steering torque which is obtained based on information including the steering angle, the steering torque and the vehicle speed. In the instant case, the elasticity compensation value may be elasticity compensation torque, and the target control value may be final auxiliary steering torque which should be outputted from the motor.

Alternatively, the motor control value may be motor current which is obtained based on information including the steering angle, the steering torque and the vehicle speed. In the instant case, the elasticity compensation value may be elasticity compensation current, and the target control value may be target motor current.

The motor control logic device 24 controls motor current to be substantially applied to the motor depending on the target control value. Accordingly, the auxiliary steering torque to be outputted from the motor is controlled.

In the above-mentioned configuration, the elasticity compensation control for compensating for the motor control value to be outputted from the basic MDPS logic device 21 is performed using the elasticity compensation value. In this regard, the motor control value to be outputted from the basic MDPS logic device 21 is compensated for by the elasticity compensation value by the compensation logic device 23 to determine the target control value.

Referring to FIG. 2, to enhance the elasticity that is felt by the driver, the steering torque in the (+) or (−) direction is compensated for in the steering section S1 or S2 such that the steering torque sensed by the driver can be increased.

That is, in the steering section S1 or S2, to embody a compensated steering torque curve of FIG. 2, the (+) or (−) directional auxiliary steering torque to be outputted from the motor is controlled to be reduced through the elasticity compensation logic, compared to that of the case where compensation is not applied.

Furthermore, in an on-center region having a predetermined steering angle range including 0° that refers to the on-center position, a variation rate (inclination) of the steering torque with respect to variation in the steering angle when the elasticity compensation is applied is set such that it is greater than a variation rate of the steering torque with respect to variation in the steering angle when the elasticity compensation is not applied.

In the steering section, the (+) or (−) directional steering angle is set to be increased at a low variation rate after the (+) or (−) directional steering angle has been increased to a predetermined extent.

In other words, in the stored setting information of the compensation logic device, the elasticity compensation value may be set such that the target control value determined by compensating for the motor control value using the elasticity compensation value reduces the auxiliary steering torque to be outputted from the steering motor, compared to that of the motor control value determined before the compensation operation is performed.

Furthermore, in the stored setting information of the compensation logic device, the elasticity compensation value may be set such that, in the steering wheel on-center region that is determined by the predetermined steering angle range, the target control value determined by compensating for the motor control value using the elasticity compensation value increases the variation rate of the auxiliary steering torque with respect to variation in the steering angle, compared to that of the motor control value determined before the compensation operation is performed.

In this regard, the variation rate of the steering torque may be replaced by a variation rate of the auxiliary steering torque to be outputted from the motor.

Hence, in a steering state in which the driver operates the steering wheel from the on-center position to the right (in the (+) direction) or the left (in the (−) direction) to steer the vehicle, the driver may sense a rapid increase in the steering torque and thus sense elastic tension in the on-center region and a region adjacent thereto. As a result, the steering sensation can be improved.

Furthermore, even in the setting information of the elasticity compensation logic, the elasticity compensation value may be set such that, with regard to the restoration region R1 or R2, the driver can sense that the (+) or (−) directional steering torque is greater than that determined before the compensation operation is performed. In this regard, the compensation steering torque curve in the restoration sections R1 and R2 when this elasticity compensation value is directly applied is illustrated in FIG. 4.

Figure 4:
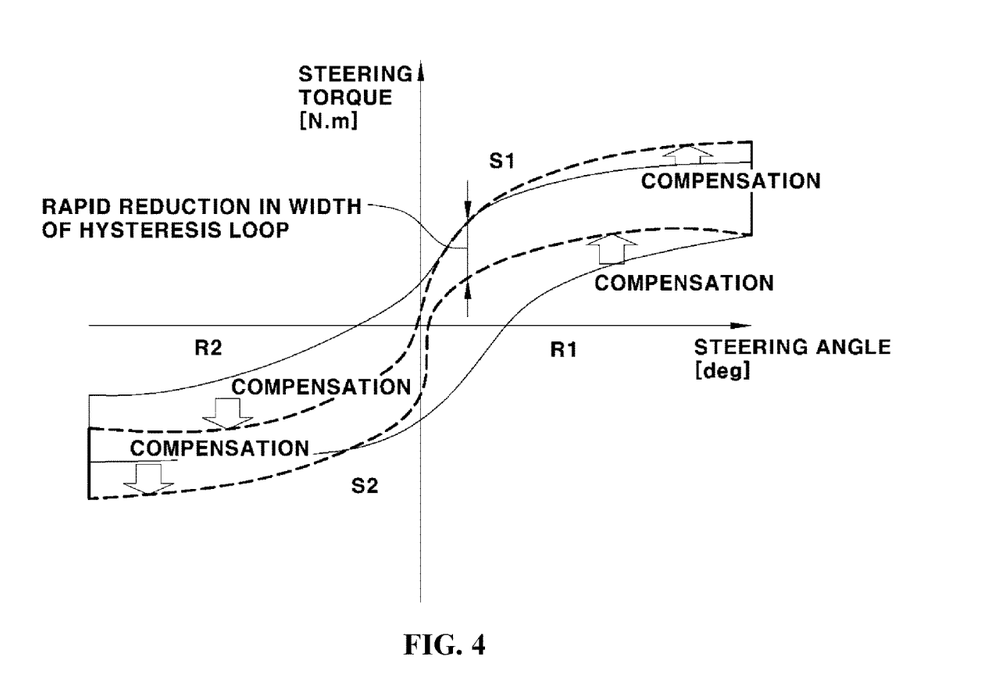
FIG. 4 is a reference view illustrating a hysteresis loop when the elasticity compensation is to be embodied in both a steering section and a restoration section.

In FIG. 4, the compensated steering torque curve in the restoration sections R1 and R2 means that, even in the restoration sections, the (+) or (−) directional steering torque is increased compared to that determined before the compensation operation is performed, in the same manner as that of the steering sections S1 and S2. In the case where the same elasticity compensation value as that of the steering sections S1 and S2 is also applied to the restoration sections R1 and R2, the steering torque sensed by the driver in the restoration section R1 or R2 is increased. Accordingly, there are problems in that the restoration performance deteriorates and, during a restoration process, the force required to rotate the steering wheel is suddenly greatly reduced.

Therefore, in the setting information of the elasticity compensation logic, in the case where the elasticity compensation value has been set such that even in the restoration sections R1 and R2 the steering torque sensed by the driver is greater than that determined before the compensation operation is performed, the steering torque is recompensated for such that the steering torque in the restoration process of the steering wheel is lower than that of the case where the elasticity compensation value is directly applied. That is, the steering torque is controlled to have a steering torque state shown in FIG. 5 through the recompensation in the restoration sections R1 and R2.

For this, after the state determination device 22 of the controller has determined whether the steering wheel is in the steering state or the restoration state, when the steering wheel is in the steering state, the compensation logic device 23 is configured to be controlled to perform only the elasticity compensation control without recompensation, whereas when the steering wheel is in the restoration state, the compensation logic device 23 is configured to be controlled such that a recompensation operation of applying an additional recompensation value is performed as well as applying the elasticity compensation value.

That is, the compensation logic device 23 is set such that, in the restoration section R1 or R2, the motor control value is compensated for using the elasticity compensation value and additionally recompensated for using a recompensation value so that the target control value is determined.

In an embodiment, in the stored setting information of the compensation logic device, the recompensation value may be set such that the target control value determined by additionally compensating for it using the recompensation value increases the auxiliary steering torque to be outputted from the steering motor, compared to that of the value determined before the additional compensation operation is performed.

Furthermore, in the stored setting information of the compensation logic device, the recompensation value may be set such that, in the steering wheel on-center region that is determined by the predetermined steering angle range, the target control value determined by additionally compensating for it using the recompensation value reduces a variation rate of the auxiliary steering torque with respect to variation in the steering angle, compared to that of the motor control value determined before the additional compensation operation is performed.

Figure 5:
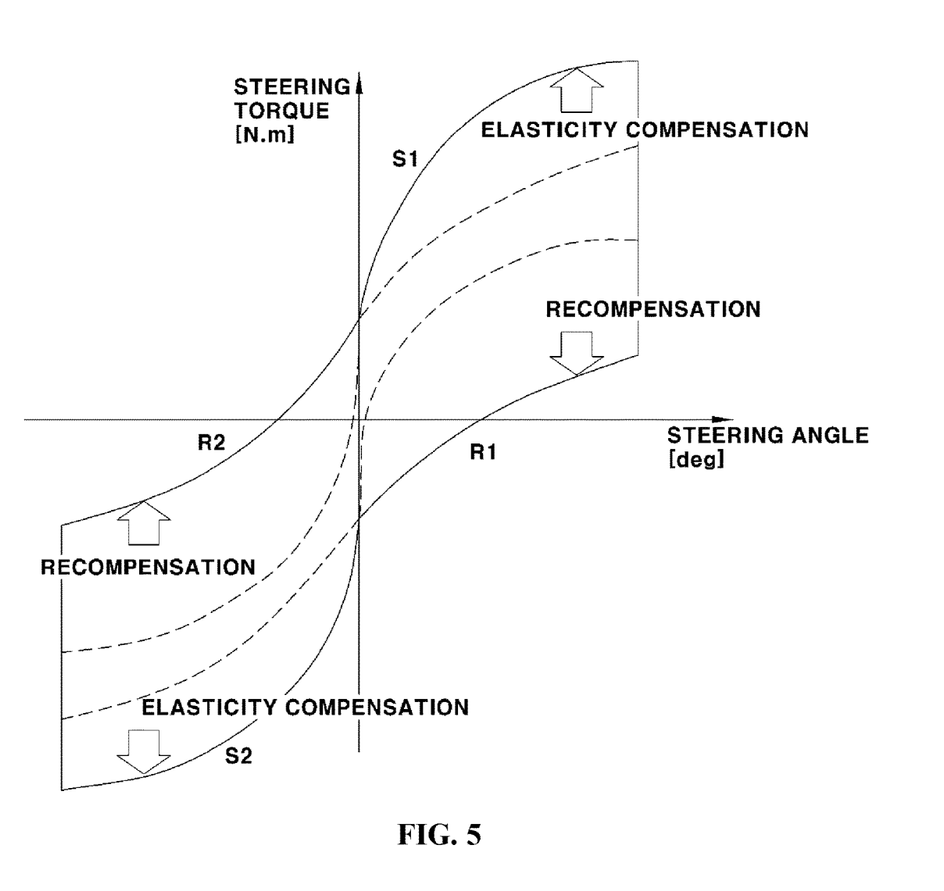
FIG. 5 is a view illustrating a hysteresis loop in the case where the elasticity compensation is embodied according to an exemplary embodiment of the present invention.

Due to the recompensation operation, in the restoration section R1 or R2, as shown in FIG. 5, the auxiliary steering torque to be outputted from the motor is configured to be increased compared to that of the case where only the elasticity compensation value is applied, thus making it possible for the driver to apply and sense a steering torque lower than that of the case where the recompensation is not applied. Accordingly, deterioration in the restoration performance can be prevented.

Furthermore, during the restoration operation using the recompensation operation, when the steering angle is gradually reduced toward the on-center position, a variation rate of the steering torque is configured to be controlled to be lower than that of the case where the recompensation is not applied. In addition, the steering torque is configured to be controlled to vary slowly and smoothly in the on-center region and a region adjacent thereto, thus preventing steering unfamiliarity which is caused when the force required to rotate the steering wheel is suddenly greatly reduced.

In the same manner as the elasticity compensation value, the recompensation value can be determined from the stored setting information by a value according to the driver steering input information and the vehicle state information, and may be a torque or current value.

Figure 6:
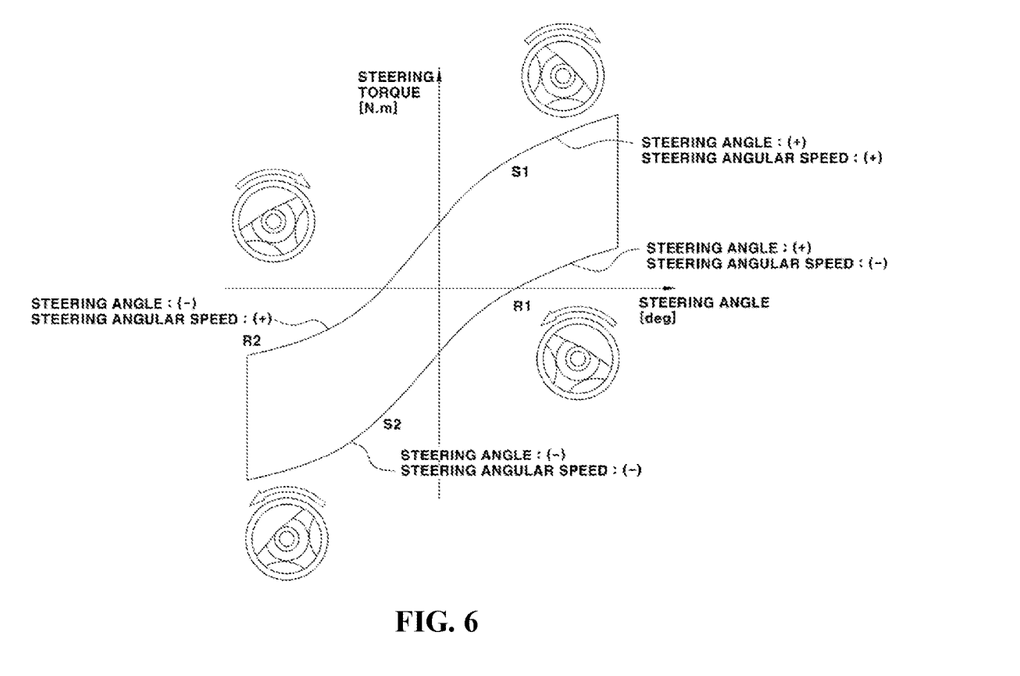
FIG. 6 is a view for describing a method of separating the steering section and the restoration section depending on manipulation of a steering wheel according to an exemplary embodiment of the present invention.

FIG. 6 is a view for describing a method of separating the steering sections S1 and S2 and the restoration sections R1 and R2 depending on manipulation of the steering wheel according to an exemplary embodiment of the present invention.

In FIG. 6, a steering angle of (+) refers to a state in which the steering wheel is rotated to a predetermined position to the right based on the on-center position 0°. In this regard, the (+) direction refers to a direction in which the steering wheel is rotated to the right.

Furthermore, a steering angle of (−) refers to a state in which the steering wheel is rotated to a predetermined position to the left based on the on-center position. In this regard, the (−) direction refers to a direction in which the steering wheel is rotated to the left.

In the case of the steering section S1, both the steering angle and the steering angular speed have (+) values. In the case of the steering section S2, both the steering angle and the steering angular speed have (−) values.

Furthermore, in the case of the restoration section R1, the steering angle has a (+) value, whereas the steering angular speed has a (−) value. In the case of the restoration section R2, the steering angle has a (−) value, whereas the steering angular speed has a (+) value.

These are shown in the following Table 1.

TABLE 1

| Classification | Steering angle | Steering angular speed |
|---|---|---|
| Steering section S1 | + | + |
| Restoration section R1 | + | − |
| Steering section S2 | − | − |
| Restoration section R2 | − | + |

Accordingly, the state determination device 22 can determine the state of the steering wheel among the steering states and the restoration states depending on the steering angle and the steering angular speed, and output the steering wheel state information depending on the result of the determination.

The compensation logic device 23 receives the steering wheel state information outputted from the state determination device 22. When the steering wheel is in a steering state, the compensation logic device 23 is configured to compensate for the motor control value using the elasticity compensation value and is configured to determine a final target control value.

On the other hand, if the steering wheel is in a restoration state, the compensation logic device 23 not only is configured to compensate for the motor control value using the elasticity compensation value but also additionally is configured to compensate for the motor control value using the recompensation value, and thus is configured to determine a final target control value.

Furthermore, the compensation logic device 23 outputs the determined final target control value to the motor control logic device 24. The motor control logic device 24 controls the operation of the motor depending on the target control value outputted from the compensation logic device 23.

There has been described an exemplary embodiment in which, in a case of the restoration state (the state in the section R1 or R2), the recompensation operation is performed such that the compensation logic device 23 is configured to determine the recompensation value and additionally is configured to compensate, using the determined recompensation value, for the motor control value compensated for by the elasticity compensation value, and thus is configured to determine the final target control value. However, in another embodiment (hereinafter, referred to as a 'second embodiment'), the compensation logic device 23 may perform the elasticity compensation control operation only when the steering wheel is in the steering state, and may not perform the elasticity compensation control operation when the steering wheel is in the restoration state.

That is, in the second embodiment, in the case of the restoration state, the elasticity compensation is not applied, and the elasticity compensation operation for the motor control value determined by and outputted from the predetermined MDPS logic device 21 is not performed.

This means that, for the case of the restoration state, both the elasticity compensation value and the recompensation value are set to '0' in the setting information, and the operation of the motor is configured to be controlled with the motor control value outputted, as the final control value, from the basic MDPS logic device 21 without compensation.

Accordingly, in the second embodiment, the motor control value is configured to be controlled such that in the restoration state, the motor control value is not compensated for. Thereby, the second embodiment can have the same effect as that of the embodiment (hereinafter, a 'first embodiment') in which the above-mentioned elasticity compensation and recompensation operations are performed.

Hereinbelow, control processes in the first and second embodiments will be described with reference to FIGS. 7 and 8.

Figure 7:
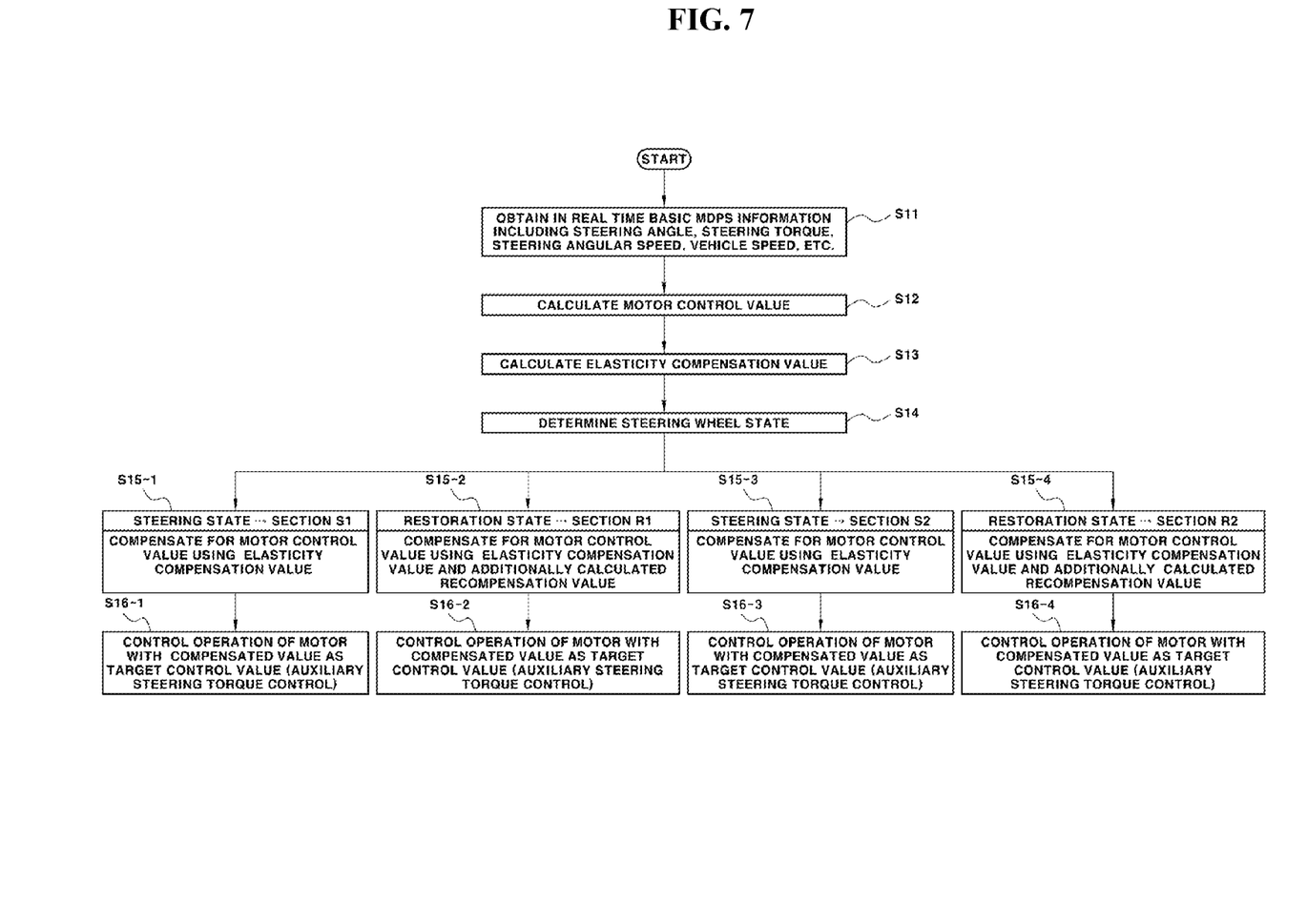
FIG. 7 and FIG. 8 are flowcharts illustrating control processes according to embodiments of the present invention.

Referring to FIG. 7, in the first embodiment, driver steering input information including a steering angle, a steering torque, and a steering angular speed, and vehicle state information such as a vehicle speed are obtained in real time (at S11). A motor control value is determined depending on the steering angle, the steering torque and the vehicle speed (at S12).

Thereafter, an elasticity compensation value is determined depending on the steering angle, the steering torque and the vehicle speed (at S13), and it is determined whether the steering wheel is in the steering state or the restoration state depending on the steering angle and the steering angular speed (at S14).

In the case where the steering wheel is in the steering state (the section S1 or S2), the determined motor control value is compensated for using the determined elasticity compensation value (at S15-1, S15-3), and the compensated value is used as the target control value to control the operation of the motor (at S16-1, S16-3). Thus, an auxiliary steering torque controlled by this operation of the motor is generated.

On the other hand, when it is determined that the steering wheel is in the restoration state, the determined motor control value is not only compensated for using the determined elasticity compensation value but also additionally compensated for by a separately determined recompensation value (at S15-2, S15-4). A value determined by the elasticity compensation operation and the additional compensation operation is used as the target control value to control the operation of the motor (at S16-2, S16-4). Thus, an auxiliary steering torque controlled by this operation of the motor is generated.

Figure 8:
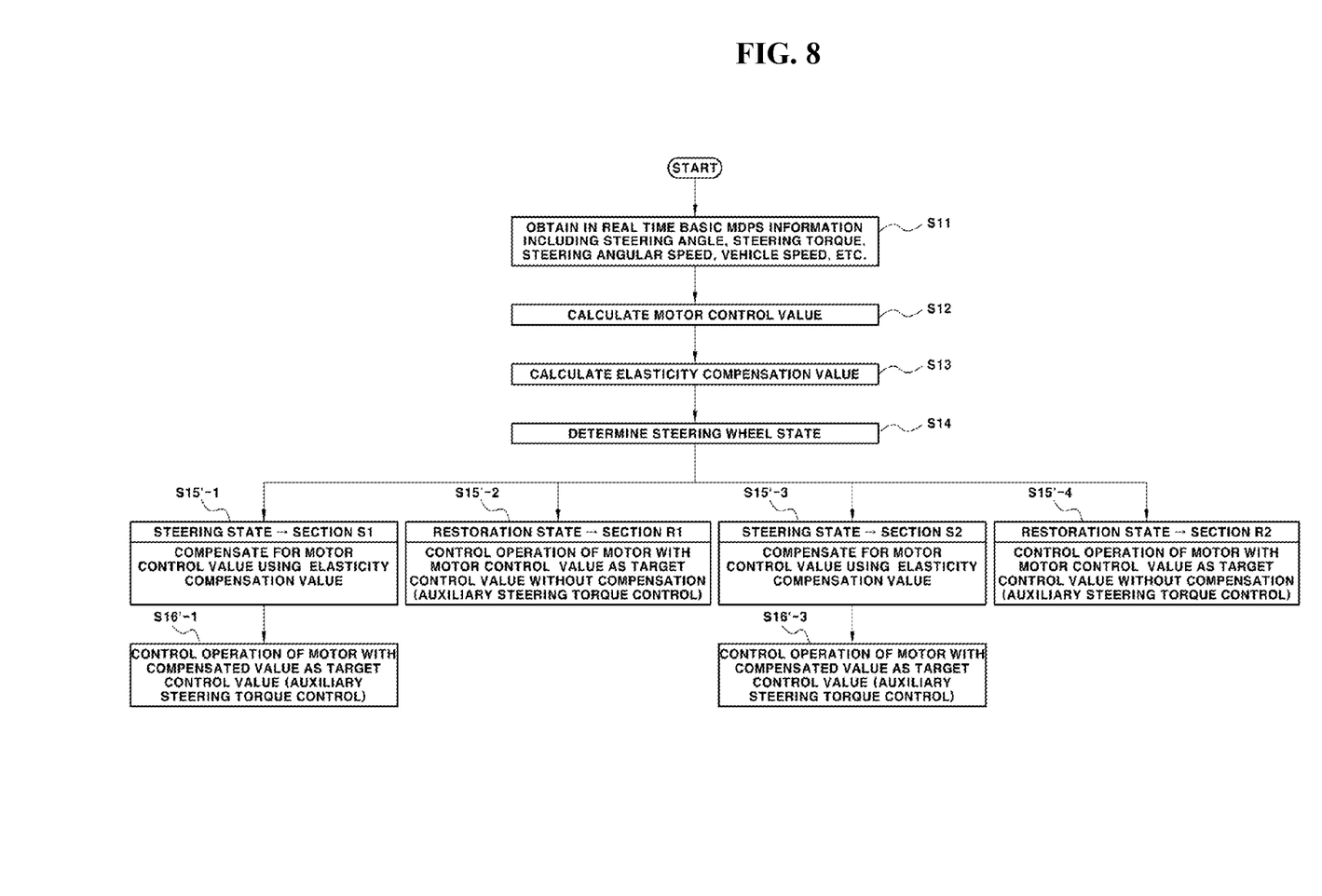

Referring to FIG. 8, in the second embodiment, the process is performed in the same manner as that of the first embodiment until the operation of determining the state of the steering wheel. After the state of the steering wheel is determined, when it is determined that it is in the steering state, the previously determined motor control value is compensated for using a separately determined elasticity compensation value (at S15'-1, S15'-3). The compensated value is used as the target control value to control the operation of the motor (at S16'-1, S16'-3). Thus, an auxiliary steering torque controlled by this operation of the motor is generated.

On the other hand, after the state of the steering wheel is determined, when it is determined that it is in the restoration state, the elasticity compensation is not applied, and the previously determined motor control value is used as the target control value to control the operation of the motor without compensation (at S15'-2, S15'-4).

That is, in a case of the restoration state, the elasticity compensation is not applied, and the operation of the motor is configured to be controlled using the previously determined motor control value without the elasticity compensation, such that an auxiliary steering torque for restoration is generated.

As described above, in the control apparatus and the method of a motor driven power steering system, the state of a steering wheel is divided into a steering state and a restoration state, and it is determined whether the steering wheel is in the steering state or the restoration state. Based on a result of the determination, a differential control operation is performed depending on the steering state or the restoration state. Therefore, the steering sensation of the driver can be enhanced not only in a steering section but also in a restoration section.

Particularly, in applying an elasticity compensation logic, deterioration in the restoration performance due to generation of unnecessary elasticity in the restoration section can be prevented. In addition, a problem of unfamiliarity in the restoration operation can be mitigated.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. A control apparatus of a motor driven power steering (MDPS) system, comprising:
    a basic MDPS logic device configured to determine and output a motor control value for steering assistance using driver steering input information and vehicle state information that are collected from a vehicle;
    a state determination device configured to determine whether a steering wheel is currently in a steering state or a restoration state based on the driver steering input information, and output steering wheel state information;
    a compensation logic device configured to determine an elasticity compensation value depending on the driver steering input information and the vehicle state information from stored setting information, and determine and output a target control value based on the motor control value, the elasticity compensation value and the steering wheel state information; and
    a motor control logic device configured to control operation of a steering motor to generate an auxiliary steering torque depending on the target control value outputted from the compensation logic device,
    wherein, when the steering wheel is in the steering state, the compensation logic device is configured to compensate for the motor control value outputted from the basic MDPS logic device, using the elasticity compensation value, and is configured to determine a compensated value as the target control value,
    wherein in the stored setting information of the compensation logic device, the elasticity compensation value is set such that the target control value determined by compensating for the motor control value using the elasticity compensation value reduces the auxiliary steering torque to be outputted from the steering motor, compared to that of the motor control value determined before the compensation is performed, wherein, when the steering wheel is in the restoration state, the compensation logic device is configured to compensate for the motor control value outputted from the basic MDPS logic device, using the elasticity compensation value, and then is additionally configured to compensate for the motor control value using a recompensation value and is configured to determine an additionally compensated value as the target control value,
    wherein the recompensation value is determined by a value depending on the driver steering input information and the vehicle state information from the stored setting information, and
    wherein in the stored setting information of the compensation logic device, the recompensation value is set such that the target control value determined by additional compensation using the recompensation value increases the auxiliary steering torque to be outputted from the steering motor, compared to that of the target control value determined before the additional compensation is performed.

2. The control apparatus according to claim 1, wherein the state determination device is configured to determine a state of the steering wheel based on a steering angle and a steering angular speed among the driver steering input information.

3. The control apparatus according to claim 2, wherein, when both the steering angle and the steering angular speed have positive (+) values or both the steering angle and the steering angular speed have negative (−) values, the state determination device is configured to determine that the steering wheel is in the steering state.

4. The control apparatus according to claim 2, wherein, when the steering angle has a positive (+) value and the steering angular speed has a negative (−) value, or the steering angle has a negative (−) value and the steering angular speed has a positive (+) value, the state determination device is configured to determine that the steering wheel is in the restoration state.

5. The control apparatus according to claim 1, wherein in the stored setting information of the compensation logic device,
    the elasticity compensation value is set such that, in a steering wheel on-center region determined by a predetermined steering angle range, the target control value determined by compensating for the motor control value using the elasticity compensation value increases a variation rate of the auxiliary steering torque with respect to variation in the steering angle, compared to that of the motor control value determined before the compensation is performed.

6. The control apparatus according to claim 1, wherein in the stored setting information of the compensation logic device,
    the recompensation value is set such that, in a steering wheel on-center region determined by a predetermined steering angle range, the target control value determined by additional compensation using the recompensation value reduces a variation rate of the auxiliary steering torque with respect to variation in the steering angle, compared to that of the target control value determined before the additional compensation is performed.

7. A control method of a motor driven power steering system, comprising:
    determining a motor control value for steering assistance using driver steering input information and vehicle state information that are collected from a vehicle;
    determining whether a steering wheel is currently in a steering state or a restoration state based on the driver steering input information;
    determining an elasticity compensation value depending on the driver steering input information and the vehicle state information from stored setting information;

determining a target control value based on the motor control value, the elasticity compensation value and the determined steering wheel state information; and controlling operation of a steering motor to generate an auxiliary steering torque depending on the target control value, wherein the determining of the target control value includes: compensating, when the steering wheel is in the steering state, for the determined motor control value using the elasticity compensation value, and determining a compensated value as the target control value, wherein in the stored setting information of the compensation logic device the elasticity compensation value is set such that the target control value determined by compensating for the motor control value using the elasticity compensation value reduces the auxiliary steering torque to be outputted from the steering motor, compared to that of the motor control value determined before the compensation is performed, wherein the determining of the target control value includes compensating, when the steering wheel is in the restoration state, for the determined motor control value using the elasticity compensation value, and then additionally compensating for the motor control value using a recompensation value and determining an additionally compensated value as the target control value, wherein the recompensation value is determined by a value depending on the driver steering input information and the vehicle state information from the stored setting information, and wherein in the stored setting information of the compensation logic device, the recompensation value is set such that the target control value determined by additional compensation using the recompensation value increases the auxiliary steering torque to be outputted from the steering motor, compared to that of the target control value determined before the additional compensation is performed.

8. The control method according to claim 7, wherein the determining of the state of the steering wheel includes determining the state of the steering wheel based on a steering angle and a steering angular speed among the driver steering input information.

9. The control method according to claim 7, wherein, when both the steering angle and the steering angular speed have positive (+) values or both the steering angle and the steering angular speed have negative (−) values, it is determined that the steering wheel is in the steering state.

10. The control method according to claim 7, wherein, when the steering angle has a positive (+) value and the steering angular speed has a negative (−) value, or the steering angle has a negative (−) value and the steering angular speed has a positive (+) value, it is determined that the steering wheel is in the restoration state.

* * * * *